(12) United States Patent
Gusliyenko

(10) Patent No.: US 7,465,502 B2
(45) Date of Patent: Dec. 16, 2008

(54) COMPOSITE MAGNETIC RECORDING STRUCTURE HAVING A METAMAGNETIC LAYER WITH FIELD INDUCED TRANSITION TO FERROMAGNETIC STATE

(75) Inventor: Kostyantyn Gusliyenko, Naperville, IL (US)

(73) Assignee: Seagate Technology LLC, Scotts Valley, CA (US)

( * ) Notice: Subject to any disclaimer, the term of this patent is extended or adjusted under 35 U.S.C. 154(b) by 568 days.

(21) Appl. No.: 11/061,905

(22) Filed: Feb. 18, 2005

(65) Prior Publication Data

US 2006/0188752 A1 Aug. 24, 2006

(51) Int. Cl.
*G11B 5/66* (2006.01)
(52) U.S. Cl. .................. 428/829; 428/827; 360/131
(58) Field of Classification Search .................. None
See application file for complete search history.

(56) References Cited

U.S. PATENT DOCUMENTS

| | | | |
|---|---|---|---|
| 5,942,342 | A | 8/1999 | Hikosaka et al. |
| 6,495,252 | B1 | 12/2002 | Richter et al. |
| 6,531,202 | B1 | 3/2003 | Litvinov et al. |
| 6,641,935 | B1 | 11/2003 | Li et al. |
| 6,645,647 | B1 | 11/2003 | Litvinov et al. |
| 6,660,357 | B1 | 12/2003 | Litvinov et al. |
| 6,667,118 | B1 | 12/2003 | Chang et al. |
| 6,709,773 | B1 | 3/2004 | Chang et al. |
| 2002/0028357 | A1 | 3/2002 | Shukh et al. |
| 2003/0022023 | A1 | 1/2003 | Carey et al. |
| 2003/0035973 | A1 | 2/2003 | Trindade et al. |
| 2003/0108721 | A1* | 6/2003 | Fullerton et al. ............ 428/195 |
| 2003/0108776 | A1 | 6/2003 | Chang et al. |
| 2003/0219627 | A1 | 11/2003 | Osaka et al. |
| 2003/0235716 | A1 | 12/2003 | Kim et al. |

(Continued)

FOREIGN PATENT DOCUMENTS

JP 1050234 2/1989

(Continued)

OTHER PUBLICATIONS

Fath, M., Freisem, S., Menovsky, A., Tomioka, Y., Aarts, J., and Mydosh, J., Science, 285, 1999, 1540-1542.*

(Continued)

*Primary Examiner*—Kevin M Bernatz
(74) *Attorney, Agent, or Firm*—Westman, Champlin & Kelly, P.A.

(57) ABSTRACT

A magnetic recording medium having a composite magnetic recording structure comprising the combination of a hard magnetic layer and a metamagnetic layer that possesses a field induced metamagnetic transition characteristic at ambient operating temperature. Under an applied external magnetic field, the metamagnetic layer transitions from an antiferromagnetic state to a ferromagnetic state, and the magnetic field induces magnetization of the metamagnetic layer. The hard magnetic recording layer is magnetically exchange coupled to the magnetized metamagnetic layer. This results in the softening of the coercivity of the overall magnetic recording structure and reduction of the required switching field during data recording. Upon removal of the applied magnetic field, the metamagnetic layer experiences transition back to an antiferromagnetic state and the coercivity of the hard magnetic layer is restored. This restoration allows the written bit to be stored at a high thermostability ratio and thus, preventing magnetization thermal decay of the data bit.

19 Claims, 3 Drawing Sheets

U.S. PATENT DOCUMENTS

2005/0163962 A1* 7/2005 Kawato et al. ............. 428/65.3

FOREIGN PATENT DOCUMENTS

| JP | 10-214719 | 8/1998 |
|---|---|---|
| JP | 2002025029 | 1/2002 |

OTHER PUBLICATIONS

Kuwahara, H., Tomioka, Y., Asamitsu, A., Moritomo, Y., and Tokura, Y., Science, 270, 1995, 961+.*

Troyanchuk, I., Samsonenko, N., Solovykh, T., Sirenko, V., Szymczak, H., and Nabialek, A., Low Temp. Phys., 23(10), 1997, 807-809.*

Teplykh, A., Pirogov, A., Kuchin, A., Prokhnenko, O., Ritter, C., Arnold, Z., and Isnard, O., Appl. Phys. A., 74[suppl.], 2002, S577-S579.*

Gaidukova, I., Guanghua, G., Granovskii, S., Dubenko, I., and Levitin, R., Phys. Sol. State, 41(11), 1999, 1885-1890.*

S. Watanabe et al., "Recording Performance of Double-Layered Perpendicular Recording Media with an Antiferromagnetic Layer", IEEE Transactions On Magnetics, vol. 39, No. 2, Mar. 2003, pp. 2288-2290.

H.S. Jung et al., "High-Moment FeCo-IrMn Exchange-Coupled Soft Underlayers for Perpendicular Media", IEEE Transactions on Magnetics, vol. 39, No. 2, Mar. 2003, pp. 679-684.

S. Takenoiri et al., "Exchange-Coupled IrMn/CoZrNb Soft Underlayers for Perpendicular Recording Media", IEEE Transactions on Magnetics, vol. 38, No. 5, Sep. 2002, pp. 1991-1993.

H.S. Jung et al., "FeTaN/IrMn Exchange-Coupled Multilayer Films as Soft Underlayers for Perpendicular Media", IEEE Transactions on Magnetics, vol. 37, No. 4, Jul. 2001, pp. 2294-2297.

T. Ando et al., "Triple-Layer Perpendicular Recording Media for High SN Ratio & Signal Stability", IEEE Transaction on Magnetics, vol. 33, No. 5, Sep. 1997, pp. 2983-2985.

Australian Patent Office Search Report of Counterpart Singapore Patent App. No. SG 200600831-2.

Australian Patent Office Examination Report Counterpart Singapore Patent App. No. SG 200600831-2.

Rossler, et al., "Synthetic Metamagnetism-Magnetic Switching of Perpendicular Antiferromagnetic Superlattices", Journal of Magnetism and Magnetic Materials, 269 (2004), pp. L287-L291.

* cited by examiner

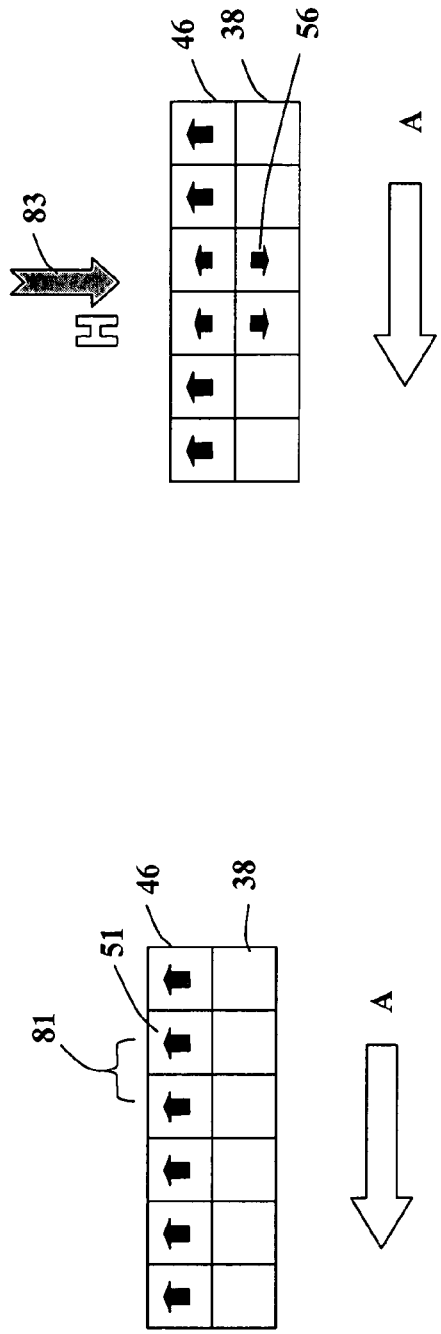
FIG. 3a
FIG. 3b
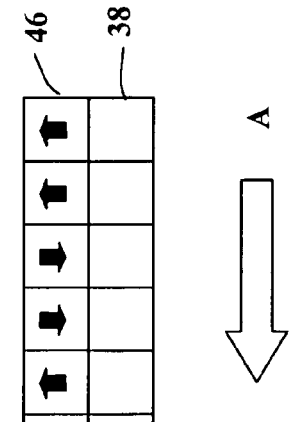
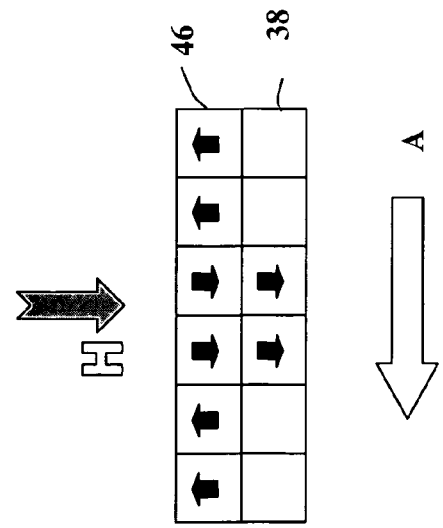
FIG. 3c
FIG. 3d

COMPOSITE MAGNETIC RECORDING STRUCTURE HAVING A METAMAGNETIC LAYER WITH FIELD INDUCED TRANSITION TO FERROMAGNETIC STATE

FIELD OF THE INVENTION

This invention relates to magnetic recording media, and in particular relates to magnetic recording media having improved thermostability and coercivity characteristics at normal recording and storage temperatures.

BACKGROUND OF THE INVENTION

There are many different forms of data recording. For example, magnetic data recording is one of the prevailing forms of data recording. Magnetic data recording may be implemented using different types of magnetic recording media, including tapes, hard discs, floppy discs, etc. Over the years, significant developments have been made to increase the areal data recording density in magnetic data recording.

Superparamagnetism is a major limiting factor to increasing magnetic recording areal density. Superparamagnetism results from thermal excitations perturbing the magnetization of grains in a ferromagnetic material, making the magnetization distribution unstable. As the magnetic media grain size is reduced for high areal density recording, superparamagnetic instabilities become more of an issue. The superparamagnetic effect is most evident when the grain volume V is sufficiently small that the inequality $K_u V/k_B T > 40$ can no longer be maintained. $K_u$ is the material's magnetocrystalline anisotropy energy density, $k_B$ is the Boltzmann's constant, and T is in absolute temperature. When this inequality is not satisfied, thermal energy demagnetizes the individual grains and the stored data bits will not be stable. Therefore, as the grain size is decreased in order to increase the areal density, a threshold is reached for a given material $K_u$ and temperature T such that stable data storage is no longer feasible.

The thermal stability can be improved by employing a recording medium formed of a material having a very high $K_u$. Large $K_u$ lead to increase of switching field characteristic of the medium (i.e., coercivity). However, the currently available recording heads are not able to provide a sufficient or high enough magnetic writing field to write on such a medium. The magnetic field delivered from the write head to reach magnetization reversal of the grain is currently limited to approximately 10 kOe.

Heat Assisted Magnetic Recording (HAMR), sometimes referred to as optical or thermal assisted recording, has been proposed to overcome at least some of the problems associated with the superparamagnetic effect. HAMR generally refers to the concept of locally heating a recording medium with a laser to reduce the coercivity of the recording medium, so that an applied magnetic writing field can more easily direct the magnetization of the recording medium during the temporary magnetic softening of the recording medium caused by the laser. By heating the medium, the $K_u$ or the coercivity is reduced such that the magnetic write field is sufficient to write to the medium. Once the medium cools to ambient temperature, the medium has a sufficiently high value of coercivity to assure thermal stability of the recorded information. Considerable design developments have been accomplished to generate the thermal energy and to efficiently direct the thermal energy toward the writing location on the recording medium.

It would be desirable to develop a recording medium with improved thermostability and coercivity characteristics to facilitate magnetic data recording using current transducer designs.

SUMMARY OF THE INVENTION

The present invention is directed to a novel magnetic recording medium having a composite magnetic recording structure comprising the combination of a hard magnetic layer and a metamagnetic layer that possesses a field induced metamagnetic transition characteristic at ambient operating temperature (i.e., in the absence of any applied external heating to assist in magnetic recording, beyond the temperature of the environment in which the magnetic recording medium operates). Under an applied external magnetic field (e.g., from the write head), the metamagnetic layer experiences transition from an antiferromagnetic state to a ferromagnetic state, and the magnetic field induces magnetization of the metamagnetic layer, even in the absence of any applied external heating beyond the ambient temperature that is below the antiferromagnetic to ferromagnetic transition temperature of the metamagnetic layer. The hard magnetic recording layer is magnetically exchange coupled to the metamagnetic layer. This field induced magnetization of the metamagnetic layer and the exchange coupling with the hard magnetic layer results in the softening of the coercivity of the overall magnetic recording structure and reduction of the required switching field during the magnetic recording process. Upon removal of the applied magnetic field, the metamagnetic layer transitions back to an antiferromagnetic state and the coercivity of the hard magnetic layer is restored. This restoration allows the written bit to be stored at a high thermostability ratio and thus, preventing magnetization thermal decay of the data bit on long time scale.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference numerals designate like or similar parts throughout the drawings.

FIG. 3a is a partially schematic side view of the hard magnetic layer in a perpendicular ferromagnetic state and the metamagnetic layer in an antiferromagnetic state.

FIG. 3b is a partially schematic side view of the hard magnetic layer in a perpendicular ferromagnetic state and the metamagnetic layer transitioning to a ferromagnetic state under the influence of the magnetic field (H) from the write head.

FIG. 3c is a partially schematic side view of the hard magnetic layer further switching its magnetic direction when the recording medium is further under the influence of the magnetic field (H) from the write head.

FIG. 3d is a partially schematic side view of the hard magnetic layer with the recorded data and the metamagnetic layer transitioning back to an antiferromagnetic state when the recording medium is no longer under the influence of the magnetic field from the write head.

DETAILED DESCRIPTION

Figure 1:
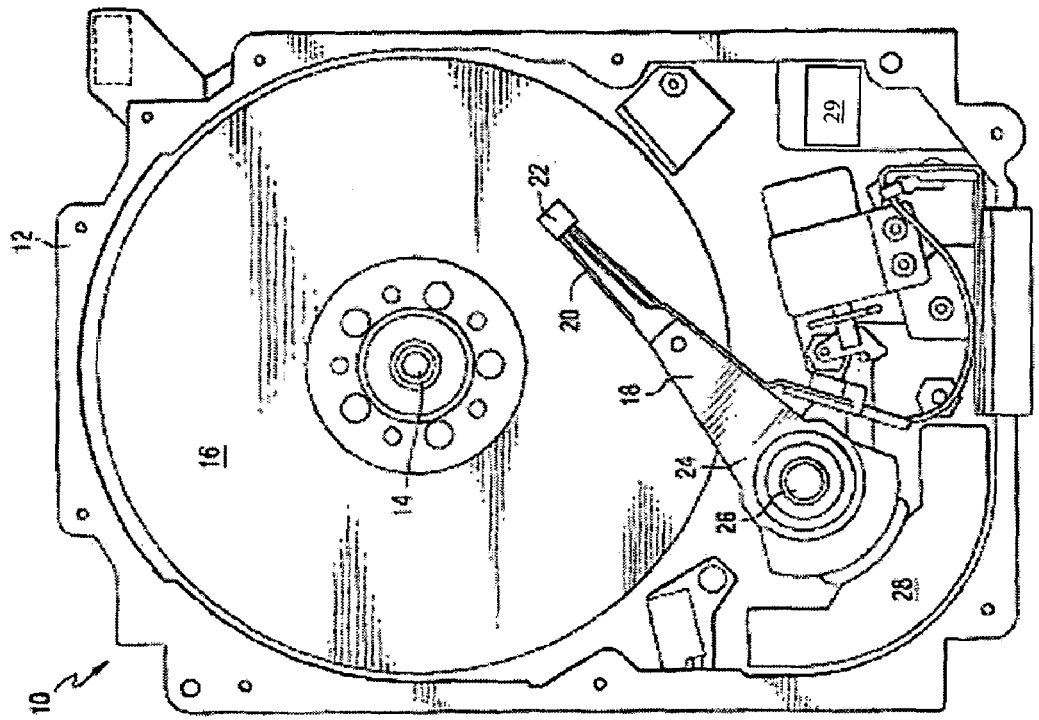
FIG. 1 is a pictorial representation of a disc drive incorporating the inventive magnetic recording medium in accordance with one embodiment of the present invention.

The present description is of the best presently contemplated mode of carrying out the invention. This description is made for the purpose of illustrating the general principles of the invention and should not be taken in a limiting sense. The scope of the invention is best determined by reference to the appended claims. This invention has been described herein in reference to various embodiments and drawings. It will be appreciated by those skilled in the art that variations and improvements may be accomplished in view of these teachings without deviating from the scope and spirit of the invention.

The present invention is directed to a magnetic recording medium for a data recording system, having a novel composite magnetic recording structure. Throughout the present disclosure, the term "metamagnetic" refers to the transition from an antiferromagnetic state to a ferromagnetic state under the influence of an external magnetic field, independent of temperature effect on such transition. As will be detailed below, the novel composite magnetic recording structure comprises the combination of a hard magnetic layer and a metamagnetic layer that possesses a field induced metamagnetic transition characteristic in ambient operating temperature (i.e., in the absence of any applied external heating to assist in magnetic recording, beyond the temperature of the environment in which the magnetic recording medium operates). The material of the metamagnetic layer may experience transition from an antiferromagnetic state to a ferromagnetic state at a certain transition temperature. Under an applied external magnetic field from the write head, the metamagnetic layer experiences transition from an antiferromagnetic state to a ferromagnetic state, and the magnetic field induces magnetization of the metamagnetic layer, at temperatures below such transition temperature (i.e., even in the absence of any applied external heating beyond an ambient temperature that is below the antiferromagnetic to ferromagnetic transition temperature of the metamagnetic layer). The hard magnetic recording layer is magnetically exchange coupled to the metamagnetic layer. This field induced magnetization of the metamagnetic layer and the exchange coupling with the hard magnetic layer results in the softening of the coercivity of the overall magnetic recording structure and reduction of the required switching field during the magnetic recording process. Upon removal of the applied magnetic field, the metamagnetic layer transitions back to an antiferromagnetic state and the coercivity of the hard magnetic layer is restored. This restoration allows the written bit to be stored at a high thermostability ratio and thus, preventing magnetization thermal decay of the data bit.

By way of illustration and not limitation, the present invention will be described in connection with a magnetic recording disc drive system, and in particular a perpendicular magnetic recording disc drive system. Perpendicular magnetic recording, as used herein, generally refers to orienting magnetic domains within a magnetic recording medium substantially perpendicular to the direction of travel of the recording head and/or recording medium. Although one embodiment of the invention is described herein with reference to perpendicular magnetic recording, it will be appreciated that aspects of the invention may also be used in conjunction with other types of recording (e.g., longitudinal) where it may be desirable to deploy the inventive magnetic recording medium.

It is well contemplated that the novel magnetic recording medium of the present invention may be applied to other types of magnetic data recording system, such as tape drives, floppy disc drives, etc., which may comprise in addition to magnetic data recording, other forms of data reading, such as a magneto-optical recording system, without departing from the scope and spirit of the present invention. While the present invention is illustrated in reference to a magnetic recording system that does not apply external heat beyond ambient heat to the magnetic medium, it is contemplated that the novel magnetic recording medium may be used in a HAMR system, for example, to reduce the amount of heat necessary to reduce the coercivity of the recording medium.

FIG. 1 is a pictorial representation of a disc drive 10 that can utilize a magnetic recording medium in accordance with this invention. The disc drive 10 includes a housing 12 (with the upper portion removed and the lower portion visible in this view) sized and configured to contain the various components of the disc drive. The disc drive 10 includes a spindle motor 14 for supporting and rotating at least one magnetic recording medium 16 within the housing, in this case a magnetic disc (which may comprise the perpendicular magnetic recording medium 40 described below). At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track of the disc 16. The actuator motor 28 is regulated by a controller 29.

Figure 2:
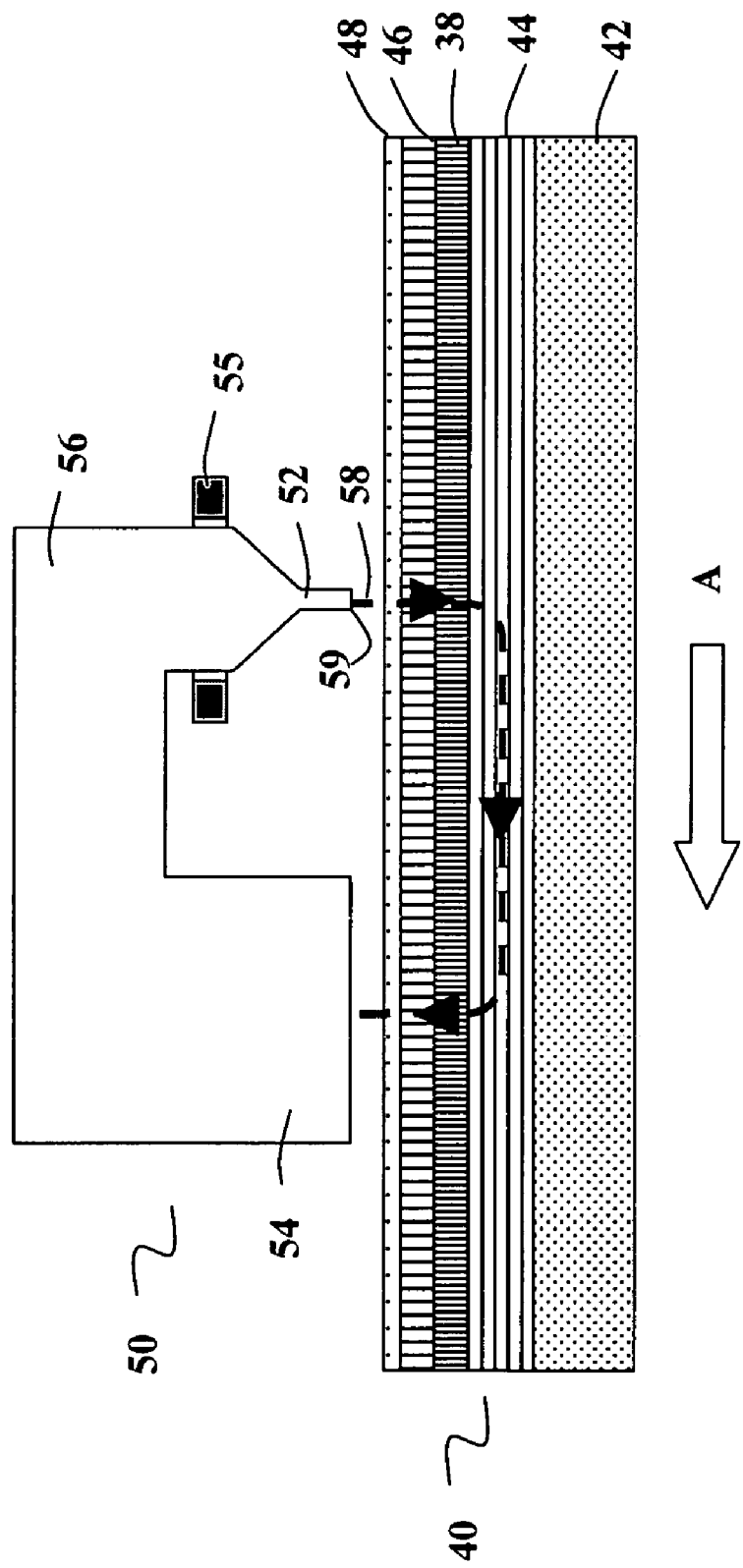
FIG. 2 is a partially schematic side view of a perpendicular recording head and the inventive magnetic medium in accordance with one embodiment of the present invention.

FIG. 2 is a partial schematic side view of a perpendicular recording head 50 and a magnetic recording medium 40 having a composite magnetic recording structure in accordance with one embodiment of the present invention. The recording head 50 may include a writer section comprising a main write pole 52 and a return pole 54 that are magnetically coupled by a yoke 56. The magnetization coil 55 surrounds the write pole 52 for energizing the recording head 50. It will be appreciated that the recording head 50 may be constructed with a write pole 52 only and no return pole 54 or yoke 56 and that the magnetization coil 55 may surround the yoke 56 instead of the write pole 52. The recording head 50 also may include a read head, not shown, which may be any conventional type read head as is generally known in the art. The magnetic recording medium 40 is positioned adjacent to or under the recording head 50 and travels in the direction of the arrow A. An air bearing surface 59 separates the recording head 50 from the medium 40 by a small distance.

The medium 40 is schematically represented as having a layered structure, including a substrate 42, a soft magnetic underlayer 44, a magnetic recording structure comprising a metamagnetic layer 38 and a hard magnetic layer 46, and a protective overcoat 48. In the illustrated embodiment, the aforementioned layers are stacked (e.g., by deposition) in the sequence shown in FIG. 2. However, it is contemplated that to the extent it is consistent with the features, functions and purpose of the present invention disclosed herein, the various layers may be stacked in a different sequence not shown. Intermediate layer or layers of materials (e.g., a buffer layer, a primer layer) may be present or provided between the layers mentioned. The reference herein to one layer being adjacent to, above, below, on, or under another layer does not necessarily mean immediately adjacent to, above, below, on, or under, and does not preclude the addition of intermediate layer or layers. Also, certain layer or layers disclosed herein may be omitted or replaced by other equivalent or different layer or layers of material. Furthermore, one or more of the layer structures may include a multilayered structure having sub-layers which are made of same or different materials. The layer structures shown need not be of a continuous structure (e.g., the magnetic layer may comprise a bit patterned hard magnetic material, or a self assembled monolayer of hard magnetic material). The layers need not be of uniform thickness (e.g., a bit patterned hard magnetic layer, or a self assembled monolayer of hard magnetic material). Other variations may be implemented without departing from the scope and spirit of the present invention.

The substrate 42 may be made of any suitable material for hard discs, such as rigid materials including ceramic glass, amorphous glass, Al, or NiP plated AlMg. For floppy discs and magnetic tape applications, suitable flexible materials may be used for the substrate. The soft magnetic underlayer 44 may be made of any suitable material such as, for example, alloys or multilayers comprising Co, Fe, Ni, Pd, Pt or Ru, such as CoFe, FeAlN, NiFe, CoZrNb, CoNiFe, FeTaN. The soft magnetic underlayer 44 may comprise one or more soft sub-layers, which may be made of the same or different materials. Suitable hard magnetic materials for the perpendicular magnetic layer 46 may include, for example, FePt, CoCrPt, CoPd, CoPt, and FePd alloys having a relatively high magnetic anisotropy at ambient temperature, such as the $L1_0$ phases of such alloys, in a multilayer structure. Other types of magnetic recording materials may be used instead for other types of magnetic recording, such as longitudinal recordings, and magneto-optical recordings. Suitable metamagnetic materials for the metamagnetic layer 38 may include materials such as $YMn_6Sn_{6-x}Ga_x$ with x≈0.1 to 0.2 and $Y_{1-x}La_xMn_2Ge_2$ with x≈0.25. Further details of these materials may be referenced to Zhang et al., Phys. Rev. B, 64, 212404 (2001); and Fuji et al., J. Magn. Magn. Mat., 54-57, 1345 (1986); which are fully incorporated by reference as if fully set forth herein. Other specific compounds disclosed in these references may also be used for the metamagnetic layer 38 with different magnetic transition characteristics of different temperatures and magnetic fields. The metamagnetic layer 38 may comprise one or multiple metamagnetic sub-layers, which may be made of the same or different materials. The protective overcoat 48 may include a diamond-like carbon layer.

The relative thicknesses of the metamagnetic layer 38 and the hard magnetic layer 46 and the choice of materials for these layers may be selected to obtain the necessary magnetic exchange coupling (e.g., >10 erg/cm$^2$) in relation to the operating magnetic field of the write head 52 and the recording density to be achieved. By way of example and not limitation, for a perpendicular magnetic hard disc drive designed to achieve a data recording density of at least 150,000 Mbits/cm$^2$, using a write head that is designed to deliver a magnetic field of at most H=10 kOe at the hard magnetic layer, which has a coercivity of at least Hc of 10 kOe, operating at an external ambient operating temperature of about 20° C., and an internal (at the inside of the drive housing) ambient temperature of about 80° C., the thickness of the metamagnetic layer 38 may be in the range of 30-100 nm, and the thickness of the hard magnetic layer 46 may be in the range of 10-30 nm. The thicknesses of the metamagnetic layer 38 and/or the hard magnetic layer 46 may be chosen with further consideration given to the thickness and choice of material for the soft underlayer 44.

The various layers of the recording medium 40 may be formed by known conventional process steps, such as sputtering, deposition, coating, etc., which may also include the steps of polishing, prepping, heat treatment (e.g., annealing), sintering, etching, lithographic masking, etc.

During the recording operation, the recording medium 40 is passed under the recording head 50 in the direction indicated by arrow A. A current is applied to the magnetization coil 55, which induces a magnetic flux 58 that is directed from the write pole 52 perpendicularly through the magnetic layer 46 and the metamagnetic layer 38, then back to the opposing pole 54. The soft underlayer 44 provides a flux path, which directs the magnetic flux 38 back to the opposing pole 54. It will be appreciated that the magnetic recording medium may be constructed without a soft underlayer for non-perpendicular recording, for example, without departing from the scope and spirit of the present invention.

FIGS. 3a to 3d illustrate the sequence of changes to the magnetization of the recording medium 40 according to one embodiment of the present invention. FIGS. 3a to 3d schematically represent the composite magnetic recording structure that comprises the metamagnetic layer 38 and the hard magnetic layer 46. The soft underlayer 44 and the protective overcoat 38 are omitted in these figures for simplicity. The drawings schematically show the magnetization reversal in the magnetic layer 46. A reference numeral 81 shown in the drawing denotes a data bit consisting of several magnetic particles 51. The relative sizes of the arrows in the magnetic particles 51 represent the relative magnitude of the magnetization and the direction of the magnetization. For purpose of discussion, at the initial stage, all the magnetization in each magnetic particle 51 in the magnetic layer 46 is set to direct upward. By applying a magnetic field H (in the direction of arrow 83) to the medium, the magnetization transition is formed. The medium is moved in the direction of arrow A.

FIG. 3a represents the state of the recording structure in the absence of the applied magnetic field. The hard magnetic layer 46 is shown in a ferromagnetic state and the magnetic moments of its particles are directed upward. The metamagnetic layer 38, on the other hand, is shown in an antiferromagnetic state and the magnetic moments of its particles are approximately zero.

FIG. 3b represents the state of the recording medium 40 in the early stage of a data bit recording process. An applied magnetic field 83 is emitted from the write pole of the write head and travels perpendicularly through the magnetic layer 46 and into the plane of the metamagnetic layer 38. Due to the high coercivity of the hard magnetic layer 46, the magnetic flux is not high enough to reverse the magnetization in the magnetic layer 46 and thus, the recording is not yet performed. However, the magnetic flux from the write head is sufficiently high enough to change the metamagnetic layer 38 from a antiferromagnetic state to a ferromagnetic state as shown by the arrows showing the magnetization direction and magnitude.

FIG. 3c represents the state of the recording medium 40 in the latter stage of a data bit recording process. Under the continuing influence of the applied magnetic field 83, the metamagnetic layer 38 is shown to have changed from an antiferromagnetic state to a ferromagnetic state with the magnetization directions pointing downward. Since the metamagnetic layer 38 is located next to the magnetic layer 46, there is exchange coupling interaction between the two layers. This exchange coupling interaction temporarily reduces the coercivity of the magnetic layer 46 to a level that allows recording to be performed by the write head. As a result, the magnetization of the magnetic layer 46 is reversed to the downward direction.

FIG. 3d represents the state of the recording medium 40 after the recording process is completed and the applied magnetic field is removed from the recording medium 40. The metamagnetic layer 38 is shown reverting back to an antiferromagnetic state and the magnetic moments of its particle returning to zero (or near antiferromagnetic state with near zero magnetic moments due to differences arising from hysteresis). Since the metamagnetic layer 38 returns to an antiferromagnetic state, and is no longer magnetically coupled to the hard magnetic layer 46, the coercivity of the magnetic layer 46 returns to its original value (or near the original value due to differences arising from hysteresis). The result is a recording of a data bit to a thermally stable recording medium that was temporarily soften to reduce the coercivity of its magnetic layer through the assistance of a metamagnetic layer and an applied external magnetic field.

It can be seen from the above disclosure that the present invention makes use of a metamagnetic layer to effectively temporarily reduces the coercivity of the hard magnetic layer during data write operation. A weaker write head of lower magnetic field strength may be deployed to work with the hard magnetic layer that ordinarily has coercivity too high for writing with the same write head at ordinary operating ambient temperature. The metamagnetic layer is made of a material that undergoes a reversible magnetic phase transition from antiferromagnetic in the absence of an applied magnetic field, to ferromagnetic state under the influence of an applied magnetic field. During data recording, the magnetic write head creates a magnetic flux of sufficient magnitude to temporarily cause the metamagnetic layer to change from an antiferromagnetic state to a ferromagnetic state. Since the metamagnetic layer is adjacent to the hard magnetic layer (in the disclosed embodiment, the metamagnetic layer is immediately adjacent the hard magnetic layer), the magnetic exchange coupling between the two layers effectively reduces the coercivity of the hard magnetic layer. This temporary softening of both layers allows the weaker write head to reverse the magnetization of the data bit in the magnetic layer, resulting in a data bit being recorded in the magnetic layer. Once the magnetic direction of the hard magnetic layer is set, the applied magnetic field can be removed from the recording medium. Without the applied magnetic field, the metamagnetic layer undergoes transition from a ferromagnetic state back to an antiferromagnetic state and thus, removing the exchange coupling between the two magnetic layers and restoring the coercivity of the hard magnetic layer to its original value. The result is that the data bit is recorded and stored in a thermally stable high bit density medium. Accordingly, the present invention allows writing to the recording material using the write field capability of available write head even without heat assisted recording, while providing a stable medium for preserving the magnetic moment of each data bit.

While particular embodiments of the invention have been described herein for the purpose of illustrating the invention and not for the purpose of limiting the same, it will be appreciated by those of ordinary skill in the art that numerous variations of the details, materials, and arrangements of parts may be made without departing from the scope of the invention as defined in the appended claims.

What is claimed is:

1. A magnetic recording medium, comprising:
a hard magnetic recording layer; and
a metamagnetic layer magnetically exchange coupled to the hard magnetic recording layer, wherein the metamagnetic layer has a characteristic of magnetic field induced reversible transitioning from an antiferromagnetic state to a ferromagnetic state when it is subject to an external applied magnetic field applied in ambient operating temperatures without any applied external heating to assist in magnetic recording, wherein the initial state of the metamagnetic layer at ambient temperature and no externally applied magnetic field (H=0) is the antiferromagnetic (AFM) state and the reversible transition to the ferromagnetic (FM) state occurs at an H less than that required to reverse the magnetization direction of the hard magnetic recording layer prior to the AFM to FM transition in the metamagnetic layer, and wherein after the AFM to FM transition the metamagnetic layer effectively lowers the coercivity of the hard magnetic recording layer to permit data recording by the externally applied magnetic field.

2. The magnetic recording medium of claim 1, wherein the metamagnetic recording layer has a transition temperature at which it undergoes transition between the antiferromagnetic state and the ferromagnetic state in the absence of the external applied magnetic field, and wherein the metamagnetic recording layer undergoes transition from the antiferromagnetic state to the ferromagnetic state at below the transition temperature in the presence of the external applied magnetic field.

3. The magnetic recording medium of claim 1, further comprising a magnetically soft layer adjacent to the metamagnetic layer and the hard magnetic layer.

4. The magnetic recording medium of claim 3, further comprising a substrate supporting the hard magnetic layer, the metamagnetic layer, and the soft layer.

5. The magnetic recording medium of claim 1, wherein the metamagnetic layer undergoes transition from the ferromagnetic state to the antiferromagnetic state at below the transition temperature in the absence of the external applied magnetic field.

6. The magnetic recording medium of claim 5, wherein the metamagnetic layer magnetically decouples from the hard magnetic layer at the antiferromagnetic state; to return the hard magnetic layer to higher coercivity.

7. The magnetic recording medium of claim 1, wherein the metamagnetic layer comprises $YMn_6Sn_{6-x}Ga_x$ with $x \approx 0.1$ to $0.2$.

8. The magnetic recording medium of claim 1, wherein the hard magnetic layer has a coercivity of at least 10kOe, and wherein at the ferromagnetic state, the metamagnetic layer effectively lowers the coercivity of the hard magnetic layer, to permit data recording at the hard magnetic layer, reaching a data recording density of at least 150,000 $Mbits/cm^2$, when subject to the external applied magnetic field of at most H=10kOe.

9. A data storage system, comprising:
a magnetic recording medium as in claim 1;
a data recording head directing a magnetic field at the magnetic recording medium; and
an actuator supporting and positioning the data recording head with respect to the data recording medium to effect data recording.

10. The magnetic recording structure of claim 9, wherein the metamagnetic layer comprises multiple metamagnetic sub-layers.

11. The magnetic recording structure of claim 10, wherein a first sub-layer of the multiple metamagnetic sub-layers comprises a first material and a second sub-layer of the multiple metamagnetic sub-layers comprises a second material.

12. The magnetic recording structure of claim 9, wherein the metamagnetic layer comprises a thickness in the range of 30-100nm.

13. The magnetic recording structure of claim 12, wherein the hard magnetic recording layer comprises a thickness in the range of 10-30nm.

14. A method of magnetic data recording, comprising the steps of:
providing a magnetic recording medium as in claim 1;
providing a data recording head to direct a magnetic field at the magnetic recording medium; and supporting and positioning the data recording head with respect to the data recording medium to effect data recording.

15. The magnetic recording medium of claim 1, wherein the metamagnetic layer comprises $Y_{1-x}La_xMn_2Ge_2$ with $x \approx 0.25$.

16. A perpendicular magnetic recording medium, comprising:
a hard magnetic recording layer configured for perpendicular recording; and
a metamagnetic layer magnetically exchange coupled to the hard magnetic recording layer, wherein the metamagnetic layer has a characteristic of magnetic field induced reversible transitioning from an antiferromagnetic state to a ferromagnetic state when it is subject to an external applied magnetic field at ambient operating temperatures, wherein the initial state of the metamagnetic layer at ambient temperature and no externally applied magnetic field (H=0) is the antiferromagnetic (AFM) state and the reversible transition to the ferromagnetic (FM) state occurs at an H less than that required to reverse the magnetization direction of the hard magnetic recording layer prior to the AFM to FM transition in the metamagnetic layer, and wherein after the AFM to FM transition the metamagnetic layer effectively lowers the coercivity of the hard magnetic recording layer to permit data recording by the externally applied magnetic field.

17. The perpendicular magnetic recording medium of claim 16 wherein the external applied magnetic field transitions from the antiferromagnetic state to the ferromagnetic state when it is subject to the external applied magnetic field without heat assisted magnetic recording.

18. A magnetic recording structure in a magnetic recording medium, comprising:
a hard magnetic recording layer; and
a metamagnetic layer magnetically exchange coupled to the hard magnetic recording layer, wherein the metamagnetic layer has a characteristic of magnetic field induced reversible transitioning from an antiferromagnetic state to a ferromagnetic state when it is subject to an external applied magnetic field without heat assisted magnetic recording, wherein the initial state of the metamagnetic layer at ambient temperature and no externally applied magnetic field (H=0) is the antiferromagnetic (AFM) state and the reversible transition to the ferromagnetic (FM) state occurs at an H less than that required to reverse the magnetization direction of the hard magnetic recording layer prior to the AFM to FM transition in the metamagnetic layer, and wherein after the AFM to FM transition the metamagnetic layer effectively lowers the coercivity of the hard magnetic recording layer to permit data recording by the externally applied magnetic field.

19. A method of making a magnetic recording medium, the method comprising:
forming a hard magnetic recording layer; and
magnetically exchange coupling a metamagnetic layer to the hard magnetic recording layer, wherein the metamagnetic layer has a characteristic of magnetic field induced reversible transitioning from an antiferromagnetic state to a ferromagnetic state when it is subject to an external applied magnetic field at ambient operating temperatures, wherein the initial state of the metamagnetic layer at ambient temperature and no externally applied magnetic field (H=0) is the antiferromagnetic (AFM) state and the reversible transition to the ferromagnetic (FM) state occurs at an H less than that required to reverse the magnetization direction of the hard magnetic recording layer prior to the AFM to FM transition in the metamagnetic layer, and wherein after the AFM to FM transition the metamagnetic layer effectively lowers the coercivity of the hard magnetic recording layer to permit data recording by the externally applied magnetic field.

* * * * *